United States Patent [19]

Evans

[11] 4,133,539
[45] Jan. 9, 1979

[54] RECORD PLAYER SWITCH-OFF MECHANISM

[75] Inventor: Phillip H. Evans, Birmingham, England

[73] Assignee: BSR Limited, West Midlands, England

[21] Appl. No.: 841,753

[22] Filed: Oct. 13, 1977

[51] Int. Cl.[2] ............................................. G11B 15/00
[52] U.S. Cl. .................................................. 274/1 L
[58] Field of Search ............ 274/1 R, 1 L, 9 R, 10 R, 274/15 R

[56] References Cited

U.S. PATENT DOCUMENTS

| | | | |
|---|---|---|---|
| 3,138,389 | 6/1964 | Hammerand | 274/15 R |
| 3,794,332 | 2/1974 | Bailey | 274/23 R X |

*Primary Examiner*—Harry N. Haroian
*Attorney, Agent, or Firm*—Kurt Kelman

[57] ABSTRACT

Automatic switch-off mechanism for a single play record player having a manually operated dash pot type cue-in device for the pick-up arm, trip mechanism which is operated by the movement of the pick-up arm when the stylus enters the "run-out" groove of a record so that the trip mechanism moves a switch-off device to effect the switch-off sequence and a locking device to hold the trip mechanism in a locked position in which it cannot operate, the locking device being coupled to the manually operable member which operates the cue-in device so that the locking device is released from the trip mechanism only when the cue-in device is operated to allow the pick-up arm to descend.

4 Claims, 4 Drawing Figures

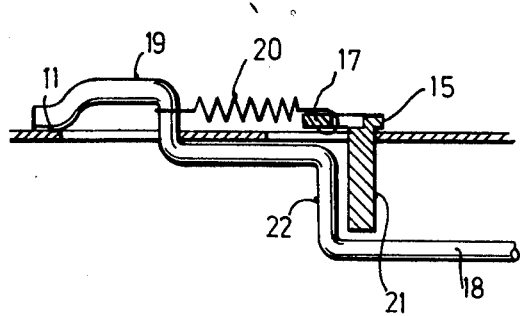
FIG. 2.
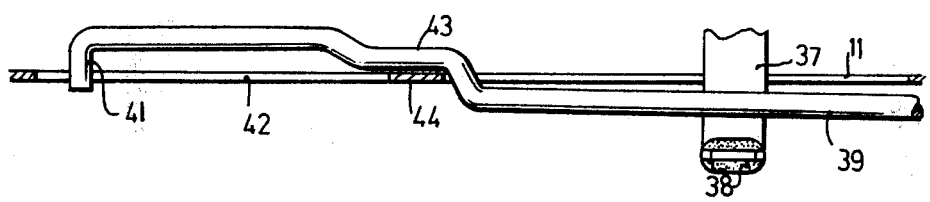
FIG. 3.
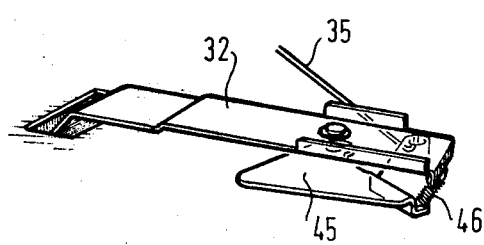

RECORD PLAYER SWITCH-OFF MECHANISM

BACKGROUND OF THE INVENTION

1. Field of the Invention

This invention relates to record players having automatic mechanism to switch off the motor at the end of playing of a record.

2. Description of the Prior Art

Such mechanisms are well known but one factor which is common to most, if not all, is that they are extremely sensitive to movement of the pick-up arm and can only operate satisfactorily, if the pick-up arm, when playing the last (i.e. innermost) part of the record, is allowed to make its inward movement in a smooth controlled manner as governed by the record groove in which the stylus is running. These automatic switch-off mechanisms are well known in the art, being commonly referred to as "tap-back" or "tap-tap" mechanisms and such a mechanism is caused to operate fully to effect switch-off when the stylus enters the final "run-out" groove of the record which causes a relatively large and rapid inwards movement of the pick-up arm as compared with its previous inwards movement during the playing of the last part of the record sound groove. Users of high quality single play record players often wish to play a selected track or tracks of a multi-track record and if a selected track happens to be one which is at or near the center of the record then a problem arises because the pick-up arm is being moved by hand to place it over the selected track and it is very difficult to perform this operation in a steady manner. What usually happens is that the users hand is not steady enough and even a slight trembling movement can be sufficient to jerk the pick-up arm inwardly by an amount sufficient to set off the switch-off mechanism and cause premature stopping of the driving motor.

SUMMARY OF THE INVENTION

The object of the invention is to provide a switch-off mechanism which will obviate this difficulty and allow a track or tracks near the center of a record to be selected and the pick-up arm engaged therewith manually without premature operation of the switch-off mechanism.

According to the invention the pick-up arm is lowered to bring the stylus into engagement with the record against the action of damping means and by movement of a manually operable member, not connected to the pick-up arm, and the trip mechanism, which acts to switch off the record player motor, is held locked in an inoperative position by locking means which is released only by the movement of said manually operable member in the operation of lowering the pick-up arm.

Thus, while the pick-up arm is being moved by hand to position it over the selected track the trip mechanism is locked out of action and cannot therefore be prematurely set off by some involuntary movement of the hand. The hand is then removed from the pick-up arm and the manually operable member is actuated at which time the pick-up arm is steady and is lowered smoothly under the influence of the damping means and it is only at this stage that the locking means is released from the trip mechanism.

By way of example there is hereinafter described in more detail one embodiment of the invention which is also illustrated in the accompanying drawings. In the interests of clarity only those details necessary for an understanding of the invention are described and illustrated in the drawings as the remainder of the parts and mechanism of the record player may take various forms and full description thereof is not necessary for those skilled in this art.

In the drawings:

FIG. 2 is a detail scrap view of the control rod in direction of arrow A.

FIG. 3 is a detail scrap view of the actuating rod in direction of arrow B.

FIG. 4 is a scrap view of an alternative arrangement of the trip lock lever.

Figure 1:
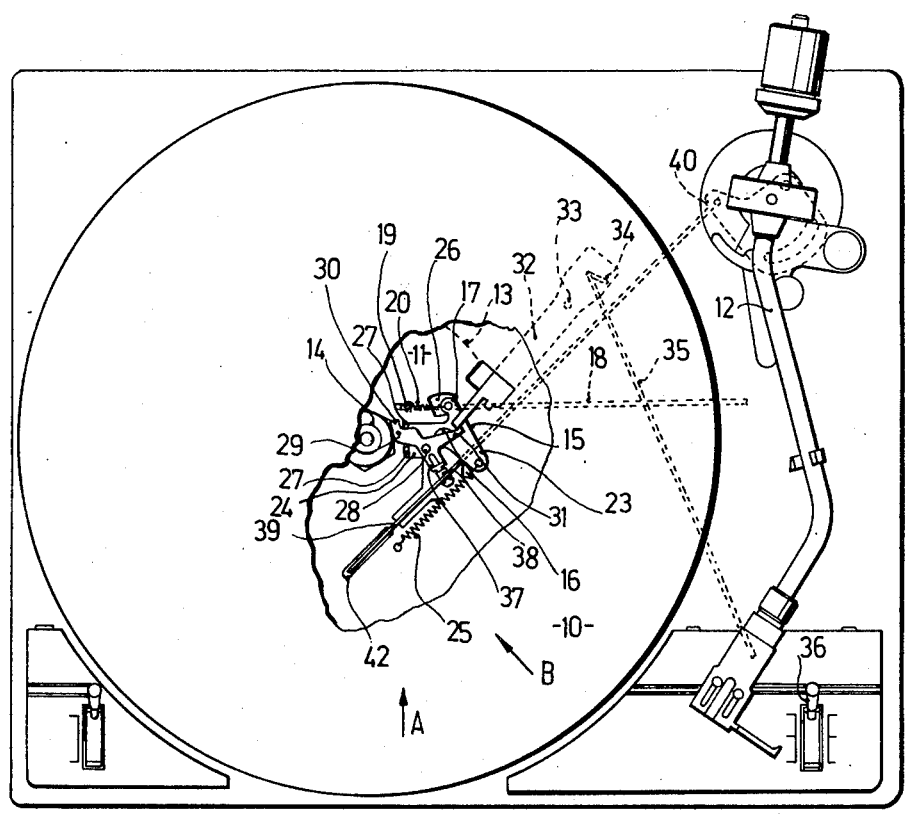
FIG. 1 is a top plan view of a record player with parts of the turntable removed to show mechanism below.

In FIG. 1 the turntable is shown at 10, partly broken away to show below it the deckplate 11 and the mechanism according to the invention. The pick-up arm 12 is mounted for tracking movement about a vertical axis in the normal way. The arc 13 indicates part of the periphery of a flange for the belt drive of the turntable and 14 indicates a hub fixed at the center of the turntable which hub has a radially outwardly projecting dog (not shown) which as hereinafter described is adapted to initiate operation of the switch-off mechanism at the appropriate time.

The switch-off mechanism comprises a plate 15 pivoted to the deckplate 11 about a vertical axis 16 and having a projecting lug 17 to which is connected one end of a control rod 18. As shown in more detail in the scrap view of FIG. 2, the part 19 at the inner end of control rod 18 is connected to one end of an overload spring 20 the other end of which is connected to the lug 17 and from below the plate 15 there projects a lug 21 which has engagement with a shoulder 22 formed in the control rod 18. (The purpose of overload spring 20 is mentioned later).

At its outer end (remote from the eye 19) the control rod 18 is connected to mechanism (not shown) which, upon movement of the control rod from right to left as seen in FIG. 2, brings about the switch-off sequence of the record player. Such mechanism does not form part of the present invention and may be of any suitable form, as known to those skilled in this art, operating to raise the pick-up arm from the record and operate an electric switch to switch off the turntable motor.

The plate 15 further comprises arms 23 and 24. A spring 25 is connected at one end to the deckplate 11 and at the other end to the arm 23 and urges pivotal movement of the plate 15 in the clockwise direction, such movement being restrained by engagement of the lug 21 on plate 15 with the edge of the aperture 26 in the deckplate 11. The arm 24 has two upstanding lugs 27 at its outer end providing therebetween a gap for a purpose hereinafter referred to.

The trip device of the switch-off mechanism comprises a three armed lever pivoted to the plate 15 about a vertical axis 28 and one arm 29 of this trip device projects through said gap between the lugs 27 on plate 15. This arm 29 also has a nose portion indicated at 30.

Another arm 31 of the three armed trip lever has its outer end engaged by the end of a trip lock lever 32 pivoted at 33 to the deckplate 11 and having adjacent its outer end an elongated slot 34 in which slidably engages the one end of a control rod 35. A light spring (not shown) acts on the outer end of lever 32 tending to maintain it in the position shown in FIG. 1. Such spring also prevents movement due to friction of lever 32 when the control rod 35 moves and its end moves from the FIG. 1 position to the end of slot 34. The other end of this control rod 35 is connected to the manually operable member for operating the normal "cue-in" device (not shown). The expression "cue-in" device is well known to those skilled in this art and detailed description is not necessary. There are many known forms of such device operating on the general principle that a mechanised device having a manually operable member operates to raise the pick-up arm and also allows the pick-up arm to descend (to engage the stylus with the record) against the resistance of a dash pot. In the present example the manually operable main control member 36 has three positions and controls the switching on of the motor as well as the operation of the "cue-in" device. In one position the motor is switched off and in an intermediate position the motor is switched on and the turntable is rotating and when member 36 is moved from the intermediate position to a third (PLAY) position the "cue-in" device is operated to allow the pick-up arm to descend and engage the stylus with the record.

The third arm 37 of the three armed trip lever has at its outer end a rubber sleeve 38 for a purpose to be hereinafter described.

The mechanism for actuating the three armed trip lever comprises an actuating rod 39 pivotally connected at one end to a radial arm 40 of a quadrant plate which is fixed to the vertical pivot of the pick-up arm 12 so that as the pick-up arm is moved inwardly and outwardly the radial arm 40 pivots about the vertical axis and transmits longitudinal movement to the actuating rod 39 which has its other end 41 bent down and guided for longitudinal movement in a slot 42 in the deckplate 11 (see FIG. 3). In the position shown in FIG. 3 a cranked part 43 of actuating rod 39 is resting upon the part 44 of the deckplate and rod 39 is not making contact with the rubber sleeve 38 on the arm 37 of the three armed trip lever. This is the position which corresponds to the pick-up arm being at its outer position. When, as described hereinafter, the part 43 of this actuating rod drops off the part 44 of the deckplate the actuating rod 39 is brought into engagement with the rubber sleeve 38. This takes place when the pick-up arm reaches a predetermined position, in its inward movement, in relation to the center of the turntable.

The operation of the mechanism is as follows. When the three position manually operable member 36 is moved from the "off" position to the intermediate "on" position this has the effect of switching on the motor to drive the turntable and also moves the control rod 35 so that its end moves along the slot 34 in the lever 32 but does not effect any movement of this lever and therefore does not change the position of the mechanism. The pick-up arm is then moved manually in a clockwise direction as viewed in the drawing to bring the stylus over the commencement of the selected track on the record, which track may be the last track at the center of the record or a track which is close to this last track. This movement of the pick-up arm pivots the radial arm 40 in the clockwise direction thus moving the actuating rod 39 so that the part 43 moves from left to right in FIG. 3 along the part 44 of the deckplate and the part 43 will descend from the part 44 if the pick-up arm is moved inwards up to, or past the said predetermined position. Thus, at this position the inner end of the trip lock lever 32 is engaging the end of arm 31 of the three armed trip lever and preventing any movement, in an anti-clockwise direction, of this three armed trip lever, or, in other words, the trip mechanism is in a locked condition and inoperative.

The three position manually operable member 36 is now moved from the "on" position to the "play" position which has the effect of operating the "cue-in" device to allow the stylus to descend gradually on to the record and at the same time causes a pivotal movement of the trip lock lever 32 in the clockwise direction to bring its inner end out of engagement with the end of arm 31 and thus release the lock upon the three armed trip lever, which is now free to come into operation at the appropriate time, but it will be appreciated that as this action takes place the pick-up arm is not touched by hand and is in a steady state with the stylus merely descending slowly under the control of the dash pot of the "cue-in" device to engage the record so that there is no danger of any involuntary inwards movement of the pick-up arm which might prematurely set off the trip mechanism.

The selected track of the record is then played in the normal way. When the movement imparted to the actuating rod 39 has been great enough to bring its part 43 off the part 44 of the deckplate and the actuating rod 39 has dropped into engagement with the rubber sleeve 38, then the frictional engagement between actuating rod 39 and rubber sleeve 38 is such that movement of actuating rod 39 will cause pivotal movement of the three armed trip lever. Thus, as the pick-up arm moves inwardly from such position during play, the actuating rod 39 moves and the three armed trip lever pivots anti-clockwise and functions in the same way as a conventional "tap-back" trip with the nose 30 being tapped back by the dog on hub 14 each time the nose is moved a slight amont into the path of the dog, and the rubber sleeve 38 slips back below the rod 39. When the stylus enters the normal fast run-out groove at the end of the innermost track the movement imparted to actuating rod 39 is sufficient to cause enough pivotal movement of the three armed trip lever in an anti-clockwise direction such that its nose 30 is moved fully into the path of the aforesaid dog on the hub 14 and when engaged by this dog is moved further in an anti-clockwise direction so that its arm 29 engaging between the lugs 27 causes a pivotal movement of the plate 15 which is transmitted to the control rod 18 and thus results in the switching off of the driving motor.

If it is desired to play a selected track or tracks which does not include the innermost track of the record, then the operation is performed as above described but at the end of the playing of the selected track or the last of the selected tracks the three position manually operable device will be actuated to operate the "cue-in" device and raise the pick-up arm from the record.

Thus it will be seen that the invention provides a means whereby the innermost track or a track adjacent thereto can be selected manually for playing without any danger of involuntary movement of the pick-up arm causing premature operation of the trip and switch-off mechanism.

Referring to the overload spring 20; if there should occur any mechanical fault, such as a part-jamming, after the control rod 18 has been moved in the direction to effect switch-off, then the motor may still be running and, if the control rod 18 and plate 15 were directly connected together, then the plate 15 would be held in by the stationary control rod (which is prevented from moving because of the jam) and the noze 30 would be held in the path of movement of the dog on the turntable boss 14, causing objectionable noise as the rotating dog pushed its way past the noze 30. However, this will not happen because the return spring 25 is strong enough to overcome the overload spring 20 and cause pivotal movement of the plate 15 to bring it back to its inoperative position.

With reference to FIG. 4, instead of the slot 34, the lost motion connection between the trip lock lever 32 and control rod 35 takes the form of a plate 45 pivoted to the deck plate about the same pivotal axis as the lever 32 and connected by an over-center spring 46 to the lever 32. The control rod 35 is connected to the plate 45.

I Claim:

1. In a disc record player comprising a fixed deck plate, a rotatable turntable, a pick-up arm, a manually operable cue mechanism arranged to raise and lower the pick-up arm between an elevated condition and a "play" condition against a damping force, and a trip mechanism including a dog rotating with the turntable and a pivoted lever having a portion capable of co-operating with the dog to initiate a switch-off sequence of operations: the improvement comprising a trip lock mechanism arranged selectively to prevent operation of the trip mechanism and including a trip lock member having a portion co-operable, in a first position of the trip lock member, with the pivoted lever to restrain pivotal movement thereof into co-operation with said dog and, in a second position, to free said pivoted lever for such pivotal movement, the manually operated cue mechanism and trip lock member being operatively connected such that movement of the manually operated cue mechanism to lower the pick-up arm from an elevated to a "play" conditiion moves the trip lock member to said second position.

2. A record player according to claim 1, further comprising a control member moving in response to pivotal movement of the pick-up arm in a direction towards the center of the turntable to operate said trip mechanism, and wherein said pivoted lever comprises three arms, a first arm of the lever having a free end portion carrying a nose adapted to be pivoted into the path of, and to co-operate with said dog, a second arm of the lever cooperating with the trip lock member in the first position thereof, and a third arm of the lever being engageable by said control member.

3. A record player according to claim 2, further comprising a plate pivotally mounted on said deck plate, said pivoted lever being pivotally mounted on the plate, said first arm being arranged, on pivotal movement of the lever in one direction of rotation, to urge said plate to rotate, said plate forming part of the trip mechanism and said rotation thereof causing the trip mechanism to operate.

4. A record player according to claim 2, wherein said control member comprises a rod having a pair of end portions, one end portion being moved in response to pivotal movement of the pick-up arm towards the center of the turntable and the other end portion being constrained for straight line movement, said third arm of the pivoted lever being disposed adjacent the rod and the rod being so shaped as to be capable of contacting said third arm frictionally only while the pick-up arm is positioned inwardly of a predetermined position relative to the center of the turntable.

* * * * *